(12) United States Patent
Birney et al.

(10) Patent No.: US 10,270,733 B2
(45) Date of Patent: *Apr. 23, 2019

(54) SYSTEMS AND METHOD FOR MANAGING CONTENT

(71) Applicant: Facebook, Inc., Menlo Park, CA (US)

(72) Inventors: Keith Andrew Birney, Redmond, WA (US); Daniel Joseph Giambalvo, Seattle, WA (US); Christopher Alexander Gist, Seattle, WA (US); Ashish Wahi, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/679,494

(22) Filed: Aug. 17, 2017

(65) Prior Publication Data
US 2017/0346781 A1     Nov. 30, 2017

Related U.S. Application Data

(63) Continuation of application No. 14/086,848, filed on Nov. 21, 2013, now Pat. No. 9,819,631.

(51) Int. Cl.
*G06F 15/16* (2006.01)
*H04L 12/58* (2006.01)

(52) U.S. Cl.
CPC ................................ *H04L 51/32* (2013.01)

(58) Field of Classification Search
CPC .................................................... H04L 51/32
See application file for complete search history.

(56) References Cited

U.S. PATENT DOCUMENTS

| 8,554,640 | B1 | 10/2013 | Dykstra |
| 9,819,631 | B2 * | 11/2017 | Birney .................... H04L 51/32 |
| 2011/0246572 | A1 | 10/2011 | Kollenkark |
| 2012/0124630 | A1 | 5/2012 | Wellen |
| 2012/0151322 | A1 | 6/2012 | Lindsay |
| 2015/0058750 | A1 | 2/2015 | Chakra |

\* cited by examiner

*Primary Examiner* — Yves Dalencourt
(74) *Attorney, Agent, or Firm* — Sheppard Mullin Richter & Hampton LLP

(57) ABSTRACT

A first notification of a first action by a user with respect to a first content item may be received by a computer system, the first content item having a first relationship to the user. A second notification of a second notification by the user with respect to a second content item may be received by the computer system. The second content item may have a second relationship to the user, and at least a portion of the second content item may correspond to at least a portion of the first content item. A first property of the first relationship may be managed by the computer system based on the second notification.

20 Claims, 8 Drawing Sheets

SYSTEMS AND METHOD FOR MANAGING CONTENT

CROSS-REFERENCE TO RELATED APPLICATIONS

This application is a continuation of U.S. patent application Ser. No. 14/086,848, filed on Nov. 21, 2013 and entitled "SYSTEMS AND METHOD FOR MANAGING CONTENT", which is incorporated herein by reference in its entirety.

TECHNICAL FIELD

The technical field relates to the field of social networks. More particularly, the technical field relates to content management in social networks.

BACKGROUND

A social network may allow people to develop relationships with one another. To do so, the social network may provide interactive communications between its users. Users of a social network may have the ability to exchange electronic messages, indicate relationship statuses, and share images, music, and video. Users of a social network may also have the ability to share how they interacted with content. Due to these and other features, social networks continue to grow in popularity.

Users of the social network may wish to organize content presented by the social network. Users of the social network may also want to organize content generated through services of content providing systems that are distinct from the social network. Organization of content may facilitate content management by users and encourage discussions about content. Such organization also may provide interesting insights into the behavior of the social network's users.

However, in many cases, a user's actions taken with respect to content may be difficult to manage in the social network. For instance, user interactions with an item of content may not be readily captured or logged as an event that has occurred. Accordingly, in some circumstances, the social network community may not know about or potentially benefit from occurrence of the event.

SUMMARY

A computer implemented method, a system comprising at least one processor and memory storing instructions configured to instruct the at least one processor to perform the computer-implemented method, and a computer storage medium storing computer-executable instructions that, when executed, cause a computer system to perform the computer-implemented method are disclosed. A first notification of a first action by a user with respect to a first content item may be received, the first content item having a first relationship to the user. A second notification of a second notification by the user with respect to a second content item may be received. The second content item may have a second relationship to the user, and at least a portion of the second content item may correspond to at least a portion of the first content item. A first property of the first relationship may be managed based on the second notification.

In some embodiments, a future content queue may include the first content item and a past content queue includes the second content item. At least one of the first relationship or the second relationship may be associated with an edge in a graph. The first relationship may be associated with a future consumption edge between a user node representing the user in a graph and a concept node representing the first content item in the graph. The second relationship may be associated with a past consumption edge between a user node representing the user in a graph and a concept node representing the second content item in the graph.

In various embodiments, the first action may relate to a desire to consume the first content item. The second action may relate to consumption of the second content item. The first property may comprise a visibility property of the first relationship.

In some embodiments, the managing may comprise hiding the first relationship. Items associated with a future content queue may be displayed without displaying the first content item.

In particular embodiments, at least one of the first notification or the second notification may be based on context of a communication of the user. The first content item may be maintained by a first content system and the second content item may be maintained by a second content system distinct from the first content system.

In some embodiments, the first action may be logged by a first content system and the second action may be logged by a second content system. The first action and the second action may be further logged by a social networking system.

In various embodiments, the first content item may comprise at least one of a book, an image, music, audio, video, an application, or an interactive content item. Moreover, it may be verified that the at least a portion of the second content item corresponds to the at least a portion of the first content item based on at least one of a plurality of identifier fields of the first content item and the second content item.

In some embodiments, a second property of a third relationship between another user and the first content item may be managed based on the second notification. The computer system may be incorporated into a social networking system.

Other features and embodiments are apparent from the accompanying drawings and from the following detailed description.

Figure 1:
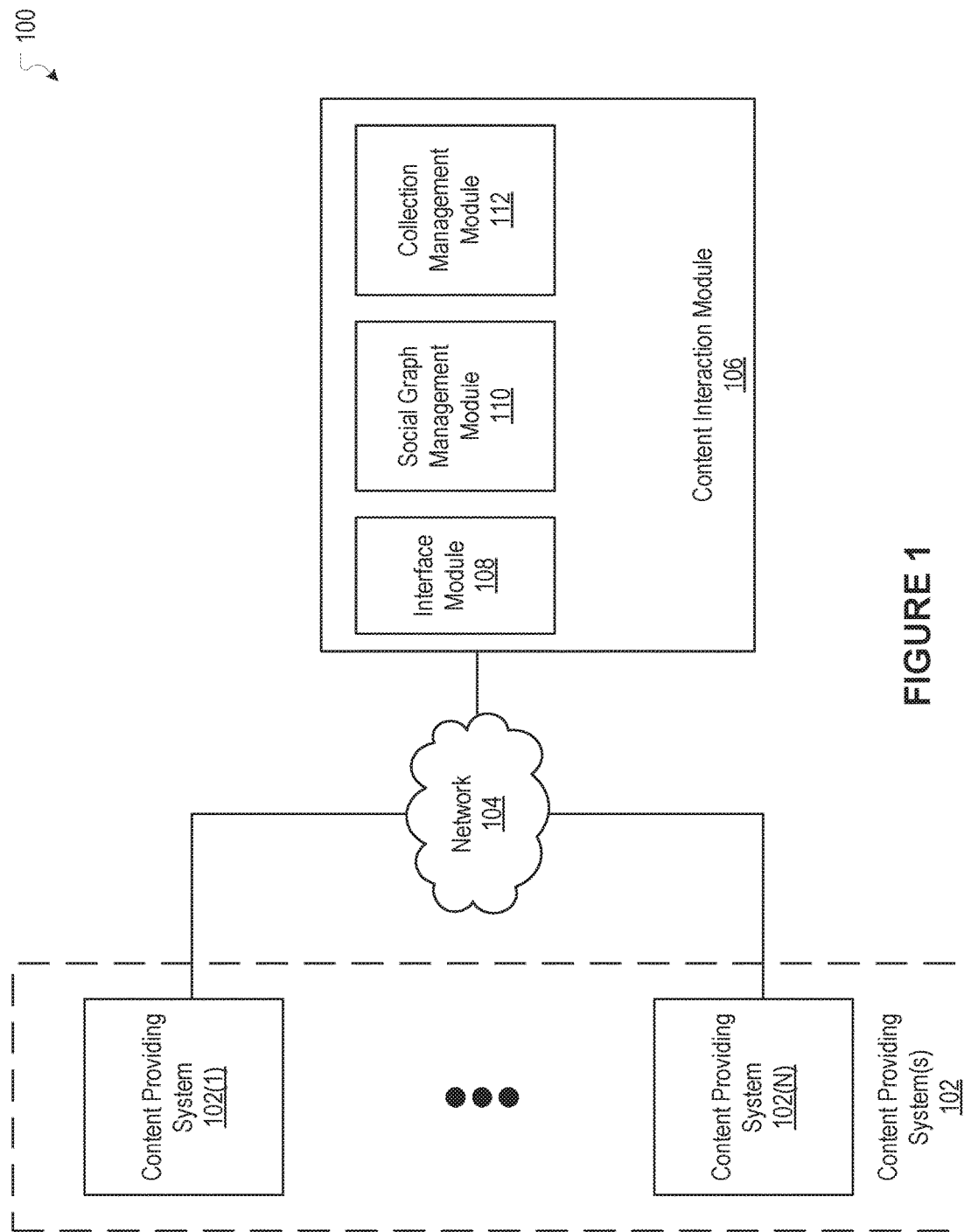
FIG. 1 shows an example of a content interaction environment, in accordance with some embodiments.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles described herein.

DETAILED DESCRIPTION

Mutual Exclusivity for Objects

A social networking system may facilitate relationships among its users. Users of a social networking system may build social, business, and other relationships based on shared interests, activities, backgrounds, real-life connections, or other considerations. Users may maintain a profile that represents their presence in the social networking system. The profile of the user may be connected to other entities that are modeled in the social networking system. With the profile, users may interact with the other entities in the social networking system. For instance, users may exchange electronic messages with each other, may indicate the status of relationships, and may share images, music, and video with each other. Users may also add items to interactive feeds associated with them. Social networking systems continue to connect large numbers of people with one another and to content on the Internet at large.

A social networking system may also allow its users to share how they interact with content items across many collection surfaces, including but not limited to books, images, music, audio, video, games, applications, and interactive content. For example, once a user has viewed a video online, the user may rate the video in a social networking system or may share the fact that he enjoyed the video. As another example, a user may post on his interactive feed that he wants to see a movie so that he can arrange to see the movie with his friends.

Interactions with content may provide interesting insights into the behavior of users. For instance, interactions with content may allow users to preserve a history of content items they interacted with and may allow advertisers to target messages to particular users. To document interactions with content items, a social networking system may implement a future content queue of content items a user intends to interact with, and a past content queue of content items that a user has already interacted with. The future content queue and the past content queue may each include content items from a single content provider or multiple content providers.

Typically, once content items have been added to a future content queue, the content items may remain visible in the future content queue. The content items may remain visible until the user manually deletes the content items from the future content queue. The content items may remain in the future content queue even if the user has interacted with or entirely consumed the content items.

FIG. 1 shows an example of a content interaction environment 100, in accordance with some embodiments. The content interaction environment 100 may provide an environment for users to interact with content items from any systems that provide content. In various embodiments, the users may be members of a social networking system. The content interaction environment 100 may be designed so that the appearance of a content item in a future content queue and the appearance of the content item in a past content queue are mutually exclusive. In various embodiments, consumption of content items by a user in the content interaction environment 100 causes the content items to appear in a past content queue. The user need not manually delete content items from the user's future content queues, even when the user has already interacted with (or consumed) the content items or has otherwise indicated that the user is finished interacting with the content items. The content interaction environment 100 may include content providing system(s) 102, a network 104, and a content interaction module 106. The components shown in this figure and all figures herein are exemplary only, and other implementations may include additional, fewer, or different components. Some components may not be shown so as not to obscure relevant details.

The content providing system(s) 102 may include a plurality of content providing systems, depicted in FIG. 1 as a first content providing system 102(1) through an Nth content providing system 102(N), where N may correspond to an integer. It is noted that, though FIG. 1 shows multiple content providing systems, in various embodiments, the content providing system(s) 102 may include a single content providing system.

The content providing system(s) 102 may provide content items. Content items may include any type of content that a user can enjoy, experience, interact with, or otherwise consume. Content items may take the form of, for example, books, magazines, music, audio, images, video, games, applications, etc. in various embodiments. In some embodiments, the content providing system(s) 102 may provide digital content items. Examples of digital content items may include but are not limited to electronic books and other types of publications, digital audio and music, digital video, and computer applications. Digital content items may include, for example, streaming content, such as streaming books, music, video, applications, or other online content. In such cases, the content providing system(s) 102 may provide streaming content or online content. The content providing system(s) 102 may also provide non-digital content items. Examples of non-digital content items may include physical books or other publications, or music or video stored in a disc or other portable or non-portable memory format.

The content items from the content providing system(s) 102 may be integrated into a larger system. One example of such a system is a social networking system. In some embodiments, the content providing system(s) 102 may represent the content items as concept nodes (or object) in a social graph that is part of the social networking system. Actions a user takes with respect to a content item may be modeled as edges between a concept node that represents the content item in the social networking system and a user node (or object) that represents the user in the social networking system. In various embodiments, the content providing system(s) 102 may configure the content items to be compatible with the social graph management module 110, which is discussed in more detail herein.

The content providing system(s) 102 may correspond to one or more entities distinct from an entity administering the social networking system. In various embodiments, the content providing system(s) 102 may correspond to publishers or providers of books, music, images, videos, games, applications, etc. For instance, the content providing system(s) 102 may correspond to digital content publishers such as publishers of electronic books and digital music as well as movie studios that provide streaming movies. The content providing system(s) 102 may also correspond to non-digital content publishers such as entities who sell the non-digital content items. Such entities may include online or brick-and-mortar booksellers, music stores, and movie stores. Providers of non-digital content may also include book publishers that provide books, music publishers that provide music, and movie studios that provide movies. It is also noted that content providing system(s) 102 may correspond to or be controlled by an entity administering the social networking system.

The network 104 may include a communications network, such as a computer network. The network 104 may provide content items from the content providing system(s) 102 to the content interaction module 106. The network 104 may further allow users to interact with content items of the content providing system(s) 102, as discussed in more detail herein.

The content interaction module 106 may facilitate interaction between users and content items. In some embodiments, the interactions may be within a social networking system. Information about interactions may be provided by various sources. In some embodiments, information about interactions between a user and a content item may be provided through actions logged by the content providing system(s) 102. More specifically, the content providing system(s) 102 may provide the content interaction module 106 with information about how a user has interacted with a content item. As an example, the content providing system(s) 102 may provide the content interaction module 106 with information that a user has added a content item to a future content queue. As another example, the content providing system(s) 102 may provide the content interaction module 106 with information that a user has finished consuming a content item (e.g., finished reading a book, finished viewing a video, etc.).

In various embodiments, information about interactions between a user and a content item may be captured and logged by a social networking system associated with the content interaction module 106. In an embodiment, the content interaction module 106 may be administered by entity that administers the social networking system. The social networking system associated with the content interaction module 106 may log events in the social networking system, the events indicating that the user has interacted with the content item. For instance, the social networking system monitor and log the fact that a user wrote a post about her intent to consume a content item or the fact that a user has finished consuming a content item. In this regard, posts that state that, for example, a user wants to read a particular book or watch a particular movie may be logged by the social networking system. Similarly, posts that state that user has already read a book, watched a movie, or rated a content item may also be logged.

In certain embodiments, the social networking system may obtain information about user interaction with content items through the context or natural language semantics of postings. For instance, a post that a user is attending a book club to discuss a chapter of a book may indicate that the user has read the chapter of the book. A post that a user has purchased permissions to watch to a particular movie may indicate the movie is in the user's future content queue for the ticket provider.

As another example, a publication of a user (e.g., a post) facilitated by the social networking system may provide contextual information to generate information about user interactions with content. The social networking system may display a selection of activities that potentially describe the user's current (or past or future) actions. The selection may include, for example, various activities in which the user may be engaged, such as "watching," "reading," listening to," "drinking," "eating," "playing," etc. A user may choose an activity from the selection that accurately describes her current activities for publication. Further, the social networking system may display a selection of objects on which the user may be acting. For example, with respect to a user's selection of "watching," the social networking system, in turn, may display a list of content items that the user likely may be consuming based on the user's profile or consumption of friends, or other social networking events and trends. Such content items in this example may include a local sports team, a popular television show, a blockbuster movie, etc. Likewise, the user may select from among the displayed content items in the list to provide further information about her actions. From this information, contextual information may be derived to create the information about the user's interaction with the content item.

As yet another example, a post by a user that indicates that the user consumed a content item with a friend may cause the content item to be placed in the friend's past content queue. Alternatively, the placement of the content item into the friend's past content queue may first require approval from the friend.

The content interaction module 106 may include an interface module 108, a social graph management module 110, and a collection management module 112. The interface module 108 may facilitate communications between the content interaction module 106 and the network 104. The interface module 108 may be implemented as a set of hardware and/or software interfaces that allow the content interaction module 106 to provide data to and receive data from the network 104 to facilitate exchange of information with the content providing system(s) 102.

The social graph management module 110 may manage social graph data related to a user's interaction with content items. Social graph data, as used herein, may refer to a social graph that, among other capabilities, can be used to model the ways users interact with concepts and with each other. The social graph may include nodes that represent both users and concepts in the social networking system. The social graph may include edges between nodes to represent relationships or actions taken between the nodes. In various embodiments, a social networking system, a client system, or a third-party system may access the social graph and related social graph information for suitable applications. The nodes and the edges of the social graph may be stored as data objects, for example, in a datastore, such as a social graph database. Such a datastore may include one or more queryable indexes of nodes or edges of the social graph that may be searched for particular applications involving the social graph.

The social graph may include user nodes and concept nodes. A user node of the social graph may represent a user of social networking system associated with the social graph management module 110. As an example, a user may be an individual (human user), an entity (e.g., an enterprise, business, or third-party application), or a group (e.g., of individuals or entities) that interacts or communicates with or over the social networking system. In particular embodiments, when a user registers for an account with the social networking system, the social networking system may create a user node corresponding to the user. The user node may be reflected in a social graph. The social networking system may store the user node in one or more datastores as part of the social graph.

As described herein, users and their associated user nodes may correspond to both registered and unregistered users of the social networking system. In particular embodiments, profile information associated with a user may be provided to the social networking system by a user herself, her connections, or information gathered by various systems, including the social networking system. As an example, a user may provide his or her name, profile picture, contact information, birth date, sex, marital status, family status, employment, education background, preferences, interests, or other demographic information. In particular embodiments, a user node may be associated with one or more objects, such as webpages, corresponding to information about a user.

In some embodiments, a concept node of the social graph managed by the social graph management module 110 may represent a concept in the social networking system. As an example, a concept may correspond to a place (such as, for example, a movie theater, restaurant, landmark, or city); a website (such as, for example, a website associated with the social networking system or a third-party website); an entity (such as, for example, a person, business, group, sports team, or celebrity); a resource (such as, for example, an audio file, video file, digital photo, text file, structured document, or application) which may be located within the social networking system or on an external server, such as a web-application server; real or intellectual property (such as, for example, a sculpture, painting, movie, game, song, idea, photograph, or written work); a game; a content item; an activity; an idea or theory; etc.

A concept node may be associated with information about a concept provided by a user or information gathered by various systems, including the social networking system. As an example, information about a concept may include a name or a title; one or more images (e.g., an image of the cover page of a book); a location (e.g., an address or a geographical location); a website (which may be associated with a URL); contact information (e.g., a phone number or an email address); or any other relevant information about the concept. In particular embodiments, a concept node may be associated with one or more data objects, such as webpages, corresponding to information about a concept.

In particular embodiments, a node of the social graph managed by the social graph management module 110 may represent or be represented by a profile webpage (or profile page). Profile pages may be hosted by or accessible to a social networking system. Profile pages may also be hosted on third-party websites associated with a third-party server that is not managed by the social networking system. As an example, a user node may have a corresponding user profile page in which the corresponding user may add content, make declarations, or otherwise express himself or herself. As another example, a concept node may have a corresponding concept profile page in which one or more users may add content, make declarations, or express themselves, particularly in relation to the corresponding concept.

In certain embodiments, a concept node of the social graph managed by the social graph management module 110 may represent a third-party webpage or resource hosted by a third-party system. The third-party system may be affiliated with an entity that is distinct from the provider of the social networking system. The third-party webpage or resource may include, among other elements, selectable content, commands, actions, and other objects in the form of icons, buttons, or the like. Selection of such objects may be implemented, for example, in JavaScript, AJAX, or PHP codes. As an example, a third-party webpage may include selectable objects such as a "like" button, a "purchase" button, a "listen to" button, a "download" button, a "share" button, a "check in" button, an "eat" button, a "recommend" button, etc. A user viewing the third-party webpage may perform an action by selecting one of the objects (e.g., an "eat" button), causing a client system to send to the social networking system a message indicating the user's action. In response to the message, the social networking system may create an edge (e.g., an "eat" edge) between a user node corresponding to the user and a concept node corresponding to the third-party webpage or resource and store the edge in one or more datastores.

In particular embodiments, a pair of nodes of the social graph managed by the social graph management module 110 may be connected to each other by one or more edges. An edge connecting a pair of nodes may represent a relationship between the pair of nodes. In particular embodiments, an edge may include or represent one or more data objects or attributes corresponding to the relationship between a pair of nodes. An edge between nodes associated with two users may represent how the users have interacted, are interacting, or will interact with one another. An edge between nodes associated with two concepts may provide a relationship between the two concepts. An edge between nodes associated with a user and a concept may indicate how the user has interacted, is interacting, or will interact with the content item.

As an example, a first user may indicate that a second user is a "friend" of the first user. In response to this indication, the social networking system may transmit a "friend request" to the second user. If the second user confirms the "friend request," the social networking system may create an edge connecting a user node associated with the first user and a user node associated with the second user in the social graph, and store the edge as social graph information. The social graph may include an edge indicating a friend relationship between user nodes of user "A" and user "B" and another edge indicating a friendship relation between the user nodes of user "C" and user "B."

Any suitable edges with any suitable attributes can connect nodes. As an example, with respect to user nodes, an edge may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. In particular embodiments, an edge between a user node and a concept node of the social graph managed by the social graph management module 110 may represent a particular action performed by an associated user on or with respect to an associated concept. As examples, such actions may include, for example, "like," "attended," "want to play," "played," "want to listen to," "listened," "cooked," "worked at," "watched," "read," "downloaded," "purchased," or any other conceivable endeavor or activity that one entity (e.g., user node or concept node) can perform on or with respect to another entity (e.g., user node or concept node). Each type of such action may correspond to an edge type or subtype.

The social networking system may create edges based on the type of actions performed. For example, a concept profile page corresponding to a concept node may include, for example, a selectable "check in" icon or a selectable "add to favorites" icon. In response to selection of these icons by a user, the social networking system may create a "check in" edge between the associated user node and the associated concept and a "favorite" edge between the associated user node and the associated concept. As another example, a user (user "C") may listen to a particular song ("Ramble On") using a particular content application (e.g., an online music provider). In this example, the social networking system may create a "listened" edge between a user node corresponding to the user and a concept node corresponding to the song. Further, the social networking system may create a "used" edge between the user node and a concept node corresponding to the content application (or a concept node corresponding to the song) to reflect that the user used the application to listen to the song.

Moreover, the social networking system may create a "played" edge between the concept nodes corresponding to the song and the application to indicate that the particular song was played by the particular application. In this case, the "played" edge corresponds to an action performed by an application external to the social networking system (e.g., the content provider "Spotify") on an audio file hosted external to the social networking system (e.g., the song "Imagine").

Although this disclosure may describe as examples particular edges with particular attributes connecting user nodes and concept nodes, this disclosure contemplates any suitable edges with any suitable attributes connecting user nodes and concept nodes. Moreover, although this disclosure may describe as examples edges between a user node and a concept node representing a single relationship, this disclosure contemplates edges between a user node and a concept node representing one or more relationships. As an example, an edge may represent both that a user likes and has used a particular concept.

In an embodiment, weights may be associated with edges based on strength or quality of the connections (or affinity) between nodes. Individual edges between two nodes may have varying coefficients that are assigned to quantitatively reflect strengths of the connections. For example, an edge "A" connecting two nodes (e.g., a user "listened" to a song) may be viewed as stronger (or more important) than an edge "B" connecting the nodes (e.g., the user "downloaded" the song). Accordingly, an edge reflecting "listened" that connects the user node and the song node may be assigned a larger coefficient than an edge reflecting "downloaded" that connects the same nodes.

Edges between nodes may reflect the state of a relationship between two nodes. In some embodiments, the social graph managed by the social graph management module 110 may generate a future consumption edge to represent planned consumption by the user of a content item. The future consumption edge may represent a desire to consume the content item. For instance, the future consumption edge may indicate a desire to read a book, to listen to a song, to watch a video, etc. The future consumption edge between a user node and a concept node for a content item may be generated when the content item has been placed in the user's future content queue. The social graph may also generate a past consumption edge to represent consumption of the content item, i.e., that the user has already consumed the content item. The past consumption edge may reflect that the user has already read a book, listened to the song, watched the movie, etc. The past consumption edge between a user node and a concept node for a content item may be generated when the content item has been placed in the user's past content queue. The placement of a content item into the future content queue or the past content queue may be performed by a user, a connection of a user, the social networking system, or any combination of the foregoing.

In particular embodiments, a social networking system may create an edge between a user node and a concept node in the social graph managed by the social graph management module 110. As an example, a user viewing a concept profile page (such as, for example, by using a web browser or a special-purpose application hosted by the user's client system) may indicate that he or she likes the corresponding concept by selecting a "like" button or icon. The selection of the "like" button may cause the user's client system to transmit to the social networking system a message indicating the user's liking of the concept. In response to the message, the social networking system may create a "like" edge between the user node and the concept node. In particular embodiments, an edge may be automatically formed in response to user action. As an example, if a user uploads a picture, downloads content, watches a movie, or listens to a song, an edge may be formed between the associated user node and the concept node corresponding to the picture, the content, the movie, or the song without additional an instruction by the user to generate the edge.

One or more of the edges in the social graph managed by the social graph management module 110 may have properties that determine whether the edges are visible to nodes. In some embodiments, an edge connecting a user node to a concept node may have visibility properties that determine whether the edge is visible to the user node. For example, in some embodiments, a future consumption edge or a past consumption edge may have a visibility property. If the visibility property is set to allow visibility, the future consumption edge or the past consumption edge may be visible to the user node. If the visibility property is set to disallow visibility, the future consumption edge or the past consumption edge may not be visible to the user node. In some embodiments, the visibility of an edge may be determined by the user, the social networking system, or both.

Figure 2:
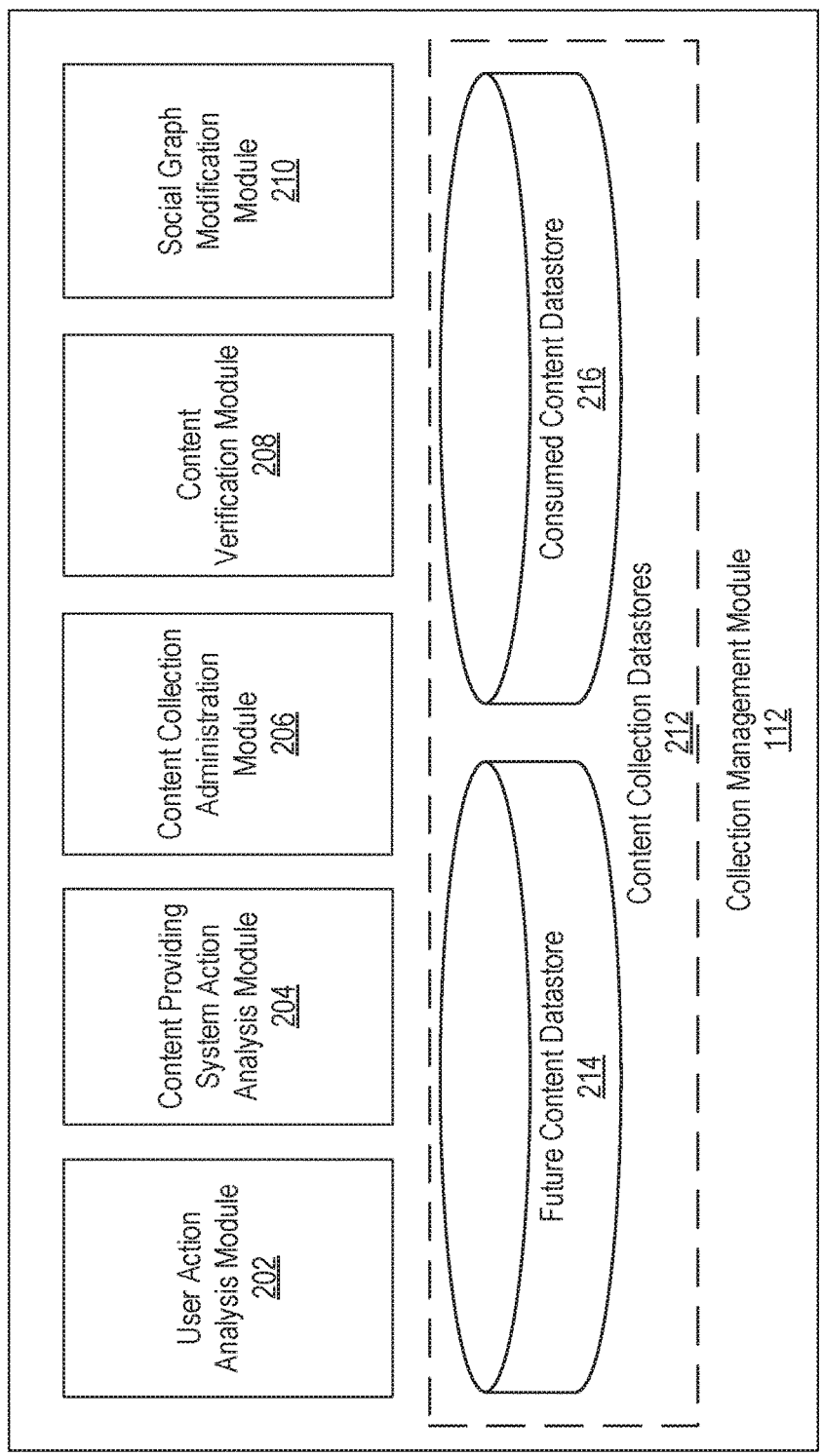
FIG. 2 shows an example of a collection management module, in accordance with some embodiments.

The collection management module 112 may manage collections of content items. FIG. 2 shows an example of the collection management module 112, in accordance with some embodiments. Collections of content items may include representations of content items that are stored by the collection management module 112. In an embodiment, the collections of content items may be organized based on how content items are related to a user node. For example, content items planned for consumption may be organized in a future content datastore, while content items already consumed may be organized in a consumed content datastore. The collection management module 112 may also receive information about user interactions with content items. In various embodiments, the collection management module 112 may modify edges or properties of edges between user nodes and concept nodes based on such information.

The collection management module 112 may include a user action analysis module 202, a content providing system action analysis module 204, a content collection administration module 206, a content verification module 208, a social graph modification module 210, and content collection datastores 212.

The user action analysis module 202 may receive from the social networking system information about user actions relating to content items. The user action analysis module 202 may monitor user actions with respect to content items. In various embodiments, the user action analysis module 202 may monitor edges between a user node and the various concept nodes associated with the user node in a social graph. The user action analysis module 202 may receive information about a new edge or a change to an edge or a property of an edge between the user node and a concept node. For example, the user action analysis module 202 may receive a notification each time a future consumption edge between the user node and a concept node has been created or otherwise modified. The user action analysis module 202 may also receive a notification each time a past consumption edge between the user node and a concept node has been created or otherwise modified.

In various embodiments, the edge creations, edge modifications, and the notifications may be based on contextual information. The contextual information may relate to natural language semantics reflected in a user's message, post, or other type of publication or communication in the social networking system. In this regard, the contextual information may be determined by applying natural language processing or other semantic analytic techniques to language published by a user or others to ascertain the actions of the user in connection with content items. In various embodiments, the contextual information may be based on other information in addition to language.

The content providing system action analysis module 204 may receive information from the content system(s) 102 about user actions relating to content items. In some embodiments, the content providing system action analysis module 204 may track whether content has been added to a future content queue or a past content queue. The content providing system action analysis module 204 may monitor edges between a user node and the various concept nodes associated with the user node in a social graph. Each time there is a new edge or change in an edge or a property of an edge between the user and a concept node, the content providing system action analysis module 204 may receive an associated notification. Like the user action analysis module 202, the edge modifications and notifications also may be based on contextual information that is provided to the social networking system and that can be processed to ascertain user actions.

The content collection administration module 206 may manage content collections for the user. In various embodiments, the content collection administration module 206 may manage the content collections with information about user interactions with content items. For example, the content collection administration module 206 may manage content collections based on notifications that the user intends to consume a content item or has already consumed the content item. The information about the user interactions may be based on the notifications received by the user action analysis module 202 and the content providing system action analysis module 204. The content collection administration module 206 may store representations of content items that the user intends to consume in a future content datastore, and may store representations of content items that the user has consumed in a consumed content datastore.

The content verification module 208 may verify that one content item corresponds to another content item. Such verification may ensure that actions taken on the one content item are reflected on the one content item, and not on other content items that appear similar to the one content item. For example, verification may ensure that a user's actions taken on a movie are reflected on that movie, and not other movies that share the same title as the movie. In particular embodiments, the content verification module 208 may look up a concept node corresponding to content items. To perform a look up, the content verification module 208 may receive an identifier, such as a unique identifier, of a content item. The unique identifier may, in various embodiments, include several fields of information that may assist in identifying the content item, such as, the title, release date, the actors, copyright date, the director, language, etc. The content verification module 208 may also compare the identifier of the content item with identifiers of stored content items in the content collection datastores 212. If the identifier of the content item matches one or more of the identifiers of the stored content items, the content verification module 208 may determine that that the content item corresponds to and is the same as the stored content items.

The social graph modification module 210 may modify social graph information based on the user's interaction with content items. In some embodiments, the social graph modification module 210 may add or modify future consumption edges between a user node and a concept node that represents a content item. The social graph modification module 210 may also add or modify past consumption edges between a user node and a concept node that represents a content item. In various embodiments, the social graph modification module 210 may modify properties of an edge of a concept node that corresponds to a content item. For instance, the social graph modification module 210 may modify whether an edge is visible or hidden to the user. Edges that may be hidden may include future consumption edges and past consumption edges, in various embodiments.

The content collection datastores 212 may maintain representations of content items that a user has interacted with. The content collection datastores 212 may include a future content datastore 214 and a consumed content datastore 216. The future content datastore 214 is associated with the future content queue and may store content items that a user intends to consume. The consumed content datastore 216 is associated with past content queue and may store content items that the user has already consumed.

Figure 3:
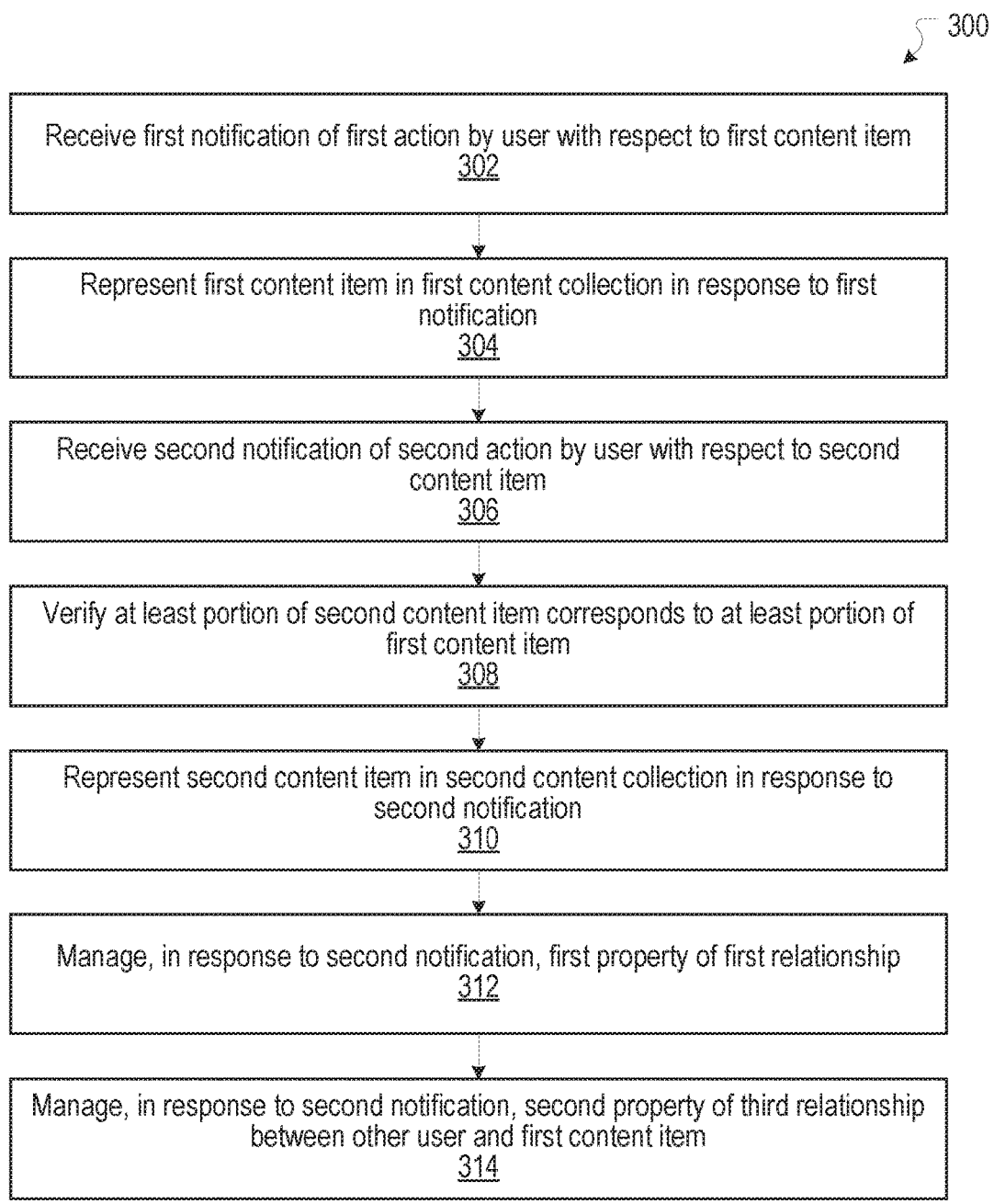
FIG. 3 shows an example of a process for managing content collections, in accordance with some embodiments.

FIG. 3 shows an example of a process 300 for managing content collections, in accordance with some embodiments. The process 300 is discussed in conjunction with the collection management module 112 shown in FIG. 2.

At block 302 a first notification of a first action by a user with respect to a first content item is received. The first action may relate to information that a user intends to consume a first content item associated with a first content collection. The first content item may have a first relationship to the user. The first relationship may include a future consumption edge between a user node representing the user and a concept node representing the first content item in a social graph.

Block 302 may be implemented using the user action analysis module 202, the content providing system action analysis module 204, or some combination thereof. In some embodiments, the user action analysis module 202 may receive from the social networking system information about user actions relating to content items. The information may include user actions logged by the social networking system and reflected in the social graph. The user action analysis module 202 may receive a notification each time a future consumption edge has been created or modified between the user node and a concept node. As an example, each time the user provides a post or message to the user's friends in the social networking system that the user intends to consume a content item, the social networking system may provide the user action analysis module 202 a notification to that effect. More specifically, if a user messages or posts to his friends that he will read a book, listen to a song, watch a movie, or take any other kind of action with respect to a content item, the social networking system may provide the user action analysis module 202 notifications about these actions. The notifications may be based on contextual information from, for example, the user's posts, messages, or other information provided to the social networking system.

In various embodiments, the content providing system action analysis module 204 may receive from the content system(s) 102 information about user actions relating to content items. The information may include user actions logged by a content providing system associated with the first content item. The content providing system action analysis module 204 may receive a notification each time a future consumption edge has been created or modified between the user node and a concept node. For example, each time the user adds a content item to the user's future content queue in the content providing system(s) 102, the content providing system(s) 102 may provide the content providing system action analysis module 204 with a notification to that effect.

At block 304, the content collection administration module 206 may represent the first content item in the first content collection in response to the first notification. In various embodiments, the content collection administration module 206 may store a representation of the first content item in the future content datastore 214. More specifically, the content collection administration module 206 may create or modify a data structure in the future content datastore 214 that corresponds to the concept node of the first content item.

At block 306, a second notification of a second action by the user with respect to a second content item is received. The second notification may relate to information that the user actually consumed a second content item associated with the second content collection. The second content item may have a second relationship with the user. The second relationship may relate to a past consumption edge between a user node representing the user and a concept node representing the second content item in a social graph.

Block 306 may be implemented using the user action analysis module 202, the content providing system action analysis module 204, or some combination thereof. In various embodiments, the user action analysis module 202 may receive from the social networking system information about user actions relating to content items. The information may include user actions logged by the social networking system and reflected in the social graph. The user action analysis module 202 may receive a notification each time a future consumption edge has been created or modified between the user node and a concept node. As an example, each time the user provides a post or message to the user's friends in the social networking system that the user has already consumed a content item, the social networking system may provide the user action analysis module 202 a notification to that effect. Posts or messages about having read a book, listened to a song, watched a movie, or taken any other kind of action with respect to a content item may allow the social networking system to provide the user action analysis module 202 relevant notifications. The notification may be based on contextual information from, for example, the user's posts, messages, or other information provided to the social networking system.

In particular embodiments, the content providing system action analysis module 204 may also receive information each time a past consumption edge has been modified between the user node and a concept node. The information may include user actions logged by a content providing system associated with the second content item. As a result, each time the user adds a content item to the user's past consumed queue in the content providing system(s) 102, the content providing system(s) 102 may provide the content providing system action analysis module 204 a notification to that effect.

At block 308, the content verification module 208 may verify that at least a portion of the second content item corresponds to, or is substantially similar or identical to, at least a portion of the first content item. The content verification module 208 may compare an identifier of the second content item to the identifier of the first content item. The comparison may include comparison of information fields of the first content item and the second content item. For instance, for a movie, the content verification module 208 may compare one or more of a title field, a release date field, an actor list field, a director field, etc. For other types of content, other information fields that can be used to identify content may be used in comparison of content items. Based on such comparisons, the content verification module 208 may determine whether the second content item corresponds to, or is substantially similar or identical to, the first content item.

At block 310, the content collection administration module 206 may represent the second content item in the second content collection in response to the second notification. In various embodiments, the content collection administration module 206 may store a representation of the second content item in the consumed content datastore 216. More specifically, the content collection administration module 206 may create or modify a data structure in the consumed content datastore 216 that corresponds to the concept node of the second content item.

At block 312, the social graph modification module 210 may manage, in response to the second notification, a first property of the first relationship. Management may include modifying, in response to the second notification, a first property of the first relationship. More specifically, the social graph modification module 210 may modify a property of an edge that couples a user node representing the user to a concept node that represents the first content item. In some embodiments, the edge may include a future consumption edge that couples the user node to the concept node. The property of the future consumption edge may include a visibility property of the future consumption edge. When the content item has been consumed, the social graph modification module 210 may hide the future consumption edge between the user node and the concept node from view by the user.

In some embodiments, the social graph modification module 210 may hide the future consumption edge between the user node and the concept node of the content item from view so that information about the future consumption edge is not reflected in interfaces accessible to the user. Accordingly, the viewable portions of a user's future content queue will appear to be updated without the need to actually delete the content item from the future content queue. In various embodiments, the content item is not deleted from the user's future content queue to preserve the user's content interaction history. That is, in some embodiments, the history may still be viewable in an activity log associated with the user and reflected in the social graph.

The hiding of the future consumption edge may provide or facilitate applications in various circumstances. For instance, the social graph modification module 210 may hide the future consumption edge between the user node and the concept node from the view of search engines that can access a social graph including the nodes. With respect to this example, if a user seeks to search his future content queue for content items that he desires to consume, the user appropriately would not find content items that are already consumed as part of his search results.

As another example, the social graph modification module 210 may hide the future consumption edge between the user node and the concept node of the content item from view in other contexts. For example, a social networking system or a content providing system 102 may provide functionality that automatically displays to a user the titles of content items that the user desires to consume. Such display could appear, for example, as auto-populated information in a search box to facilitate location of the content. The identification of such content items for display may be based on a search of the user's future content queue. Because the future consumption edge between a user node and a concept node may be hidden after consumption of the associated content item, the title of the content item may not automatically be displayed with information about content items to be consumed.

As yet another example, the social graph modification module 210 may hide the future consumption edge between the user node and the concept node of the content item from view by the content providing system(s) 102. The future consumption edge may be hidden from view by the content providing system(s) 102 after the content item has been consumed by a user. As a result, the content item may not be displayed in the future content queues for the content system(s) 102.

At block 314, the social graph modification module 210 may manage, in response to the second notification, a second property of a third relationship between another user (e.g., a friend of the original user) and the first content item. The friend of the original user also may have an associated future consumption queue that contains items of content that the friend desires to consume. The future consumption queue of the friend may include the first content item that is also associated with the original user. Accordingly, a future consumption edge may be created between a node associated with the friend and a node associated with the first content item. When the first content item is consumed by the friend, the future consumption edge may be hidden and the content item accordingly may not appear in the future consumption queue of the friend.

Figure 4:
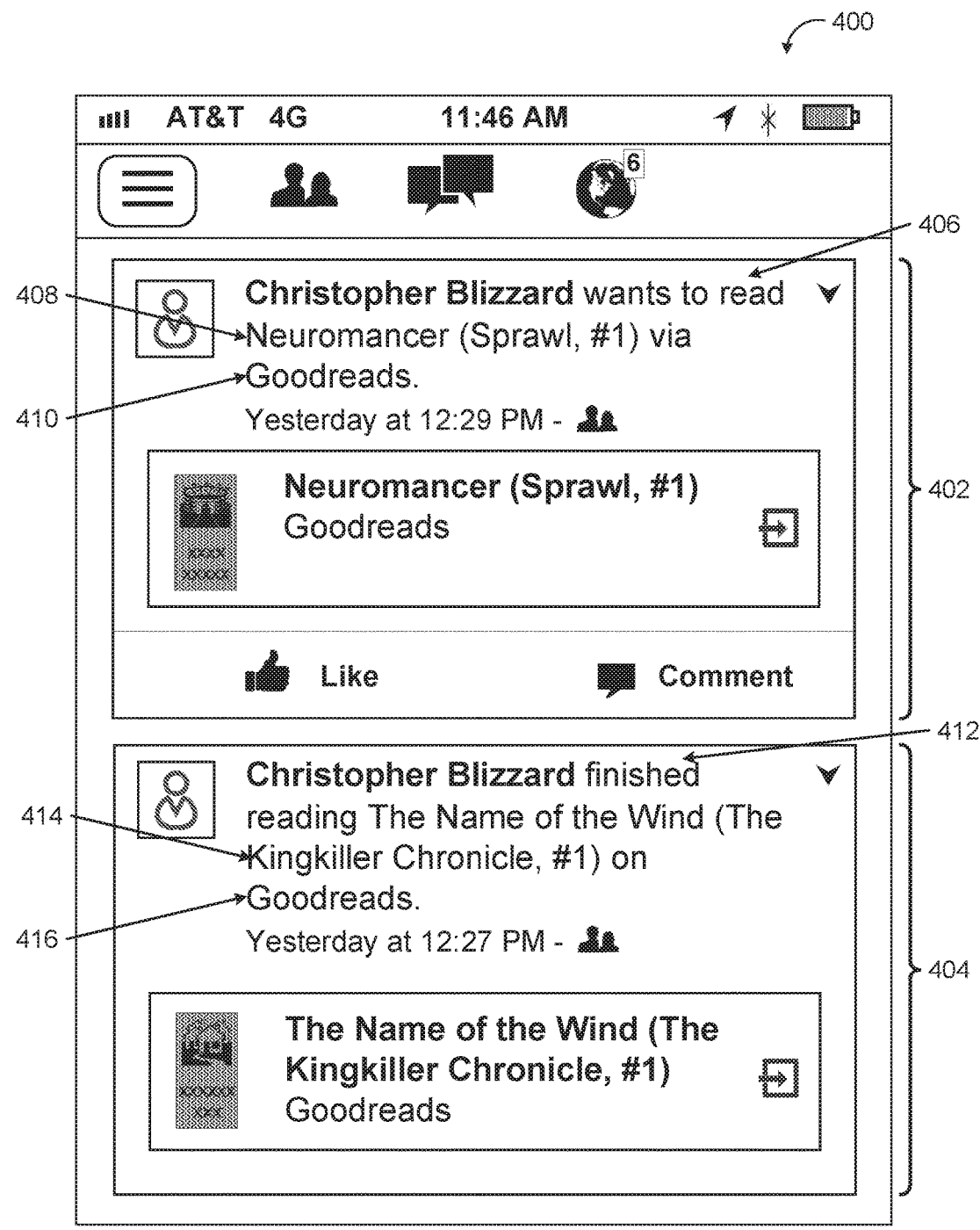
FIG. 4 shows an example of an interface reflecting content collection management in a social networking system, in accordance with some embodiments.
Figure 5:
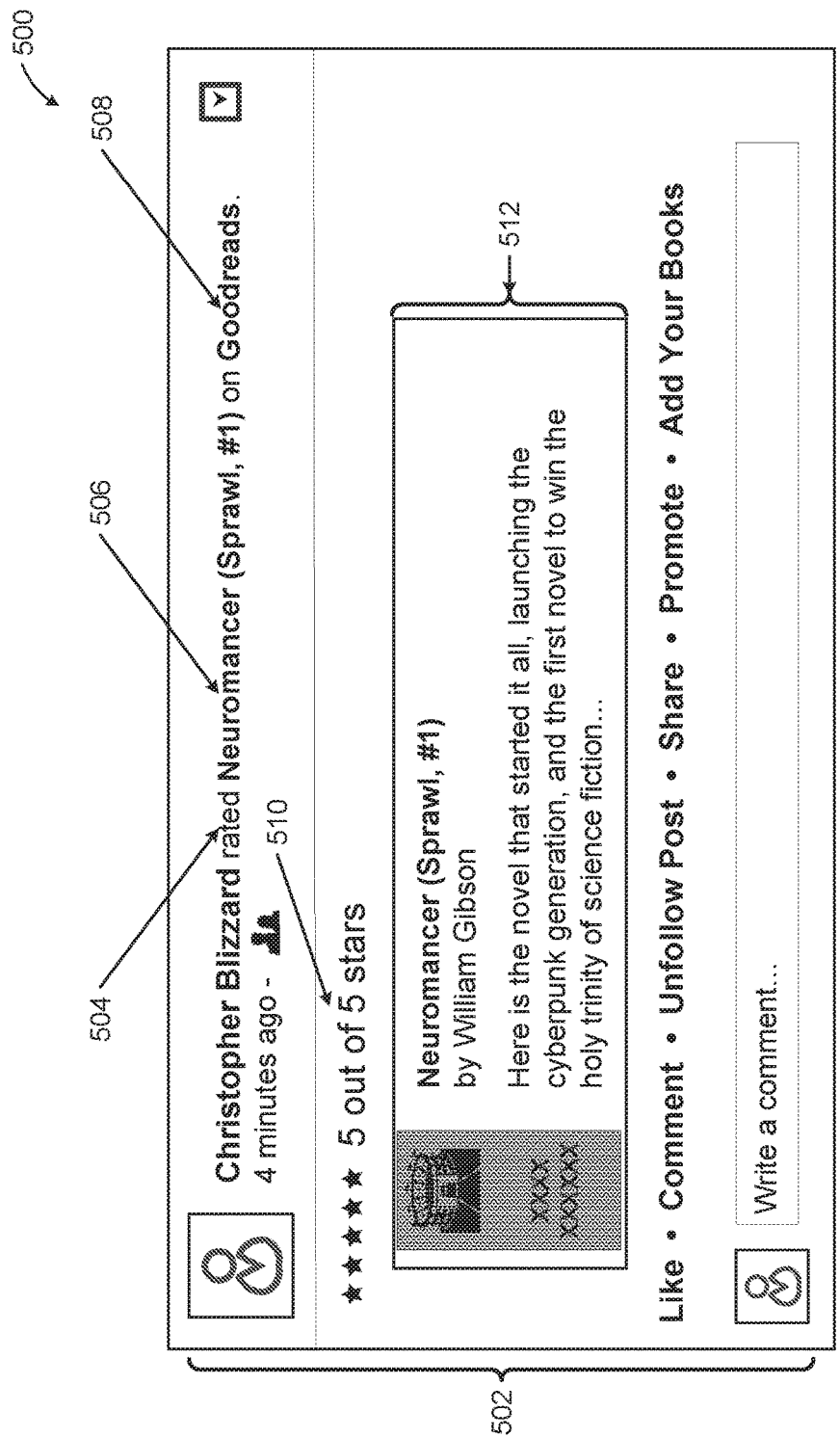
FIG. 5 shows an example of an interface reflecting content collection management in a social networking system, in accordance with some embodiments.
Figure 6:
FIG. 6 shows an example of an interface reflecting content collection management in a social networking system, in accordance with some embodiments.

FIGS. 4-6 further illustrate interfaces reflecting content collection management, in accordance with some embodiments. The interfaces may be provided by a social networking system and include publications associated with a user, such as posts and messages. FIG. 4 shows an example of an interface 400 reflecting content collection management in a social networking system, in accordance with some embodiments. The interface 400 shows interactions that a user has taken with respect to content items. The interface 400 shows a first user post 402 and a second user post 404. The first user post 402 includes a first interaction 406, a first content item 408, and a first content source 410. The first interaction 406 is reflected by the description "wants to read". The second user post 404 includes a second interaction 412, a second content item 414, and a second content source 416. The second interaction 412 is reflected by the description "finished reading". In various embodiments, any other posts or communications including any other interactions, content items, and content sources may be used.

In the first user post 402, the user has performed the first interaction 406 with respect to the first content item 408. The first interaction 406 indicates that the user wants to read material associated with the first content item 408. In the second user post 404, the user has performed the second interaction 412 with respect to the second content item 414. The second interaction 412 indicates that the user has finished reading material associated with the second content item 414.

The interface 400 may reflect one or more operations of the collection management module 112. For instance, the first interaction 406 may cause the first content item 408 to be represented in the future content datastore 214. The second interaction 412 may cause the second content item 414 to be represented in the consumed content datastore 216. Once the user action analysis module 202 has received notification that the second interaction 412 has occurred, the social graph modification module 210 may change a property of a future consumption edge between the user and the second content item 414. More specifically, the social graph modification module 210 may hide the future consumption edge so that the second content item 414 does not appear with other content items that the user desires to consume but has not yet consumed.

FIG. 5 shows an example of an interface 500 reflecting content collection management in a social networking system, in accordance with some embodiments. The interface 500 shows an interaction that a user has taken with respect to a content item. The interface 500 shows a user post 502, an interaction 504, a content item 506, a content source 508, and a consumption result 510. In the user post 502, the user has performed the interaction 504 with respect to the content item 506. The interaction 504 indicates that the user rated the content item 506 and, as a result, likely read the material associated with the content item 506. The interaction 504 may cause the content item 506 to be represented in the consumed content datastore 216. Moreover, once the user action analysis module 202 has received notification that the interaction 504 has occurred, the social graph modification module 210 may change a property of a future consumption edge between the user and the content item 506. More specifically, the social graph modification module 210 may hide the future consumption edge so that the content item 506 does not appear with other content items that are to be consumed in the future by the user. The consumption result 510 provides a property of the interaction 504. In this example, the consumption result 510 provides how the user rated the content item 506. The rating of the content item 506 serves as additional support for the inference that the content item has been consumed by the user.

FIG. 6 shows an example of an interface 600 reflecting content collection management in a social networking system, in accordance with some embodiments. The interface 600 shows a first post 602 and a second post 604. In the first post 602, the user has indicated that he has finished reading a content item. The information about the content item may be posted to the user's wall in the social networking system. The indication that the user has finished reading the content item may cause the content item to be represented in the consumed content datastore 216. Once the user action analysis module 202 has received notification that the action has occurred, the social graph modification module 210 may modify a property of a future consumption edge between the user and the content item. In some embodiments, the social graph modification module 210 may hide the future consumption edge so that the content item is not displayed with other content items that are to be consumed by the user.

In the second post 604, a friend of the user has indicated that the friend has also read the content item. In various embodiments, the friend's indication that he has read the content item may cause the content item to be represented in a consumed content datastore 216 associated with the friend. Once the user action analysis module 202 has received notification that the action has occurred, the social graph modification module 210 may modify a property of the future consumption edge between the friend and the content item. That is, the social graph modification module 210 may cause the future consumption edge to be hidden and may cause the content item not to be displayed with other content items that the friend desires to consume.

Social Networking System—Example Implementation

Figure 7:
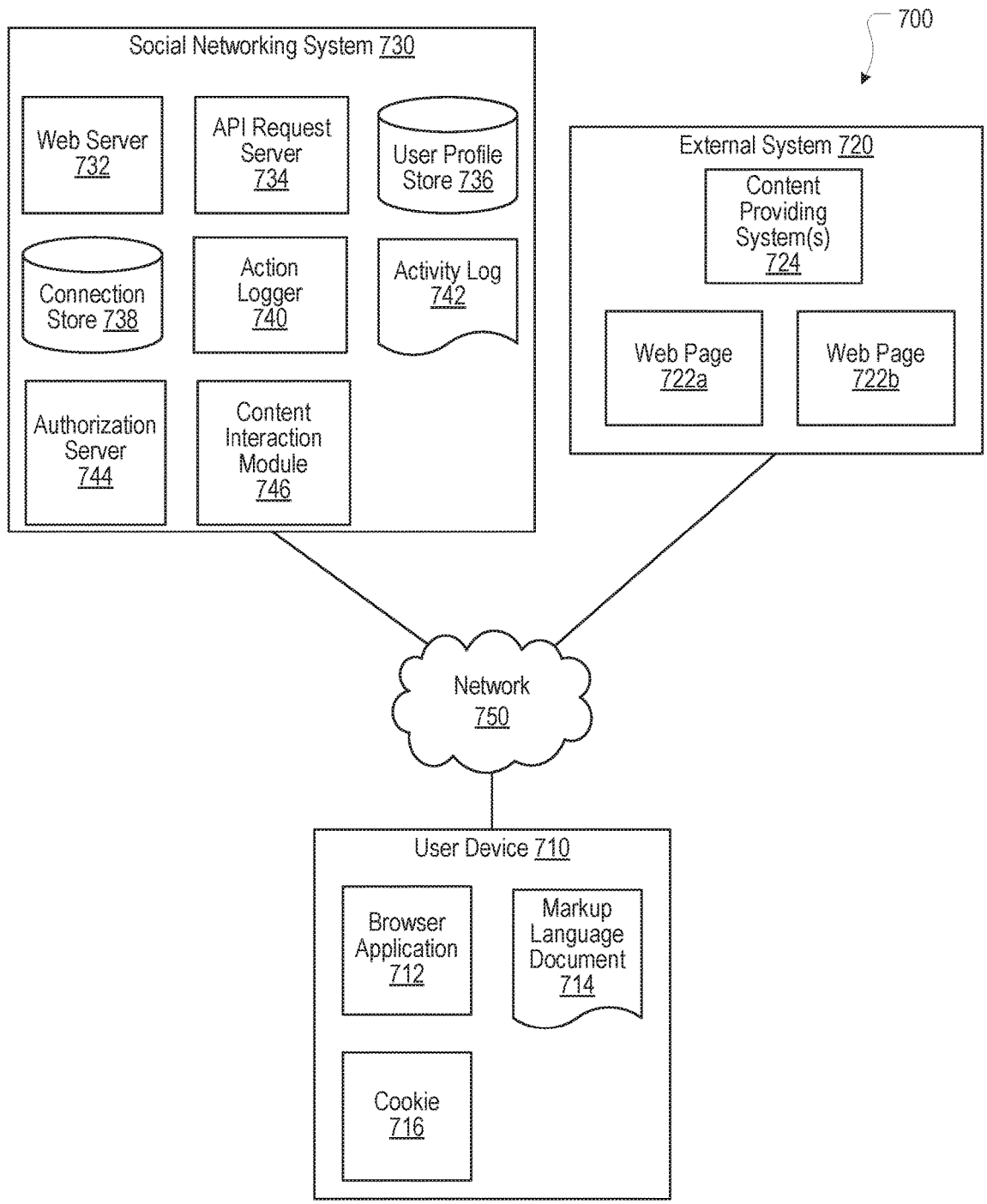
FIG. 7 shows an example of a network diagram of a content interaction environment within a social networking system, in accordance with some embodiments.

FIG. 7 is a network diagram of an example social networking system 700 in which to implement the content interaction environment 100, in accordance with some embodiments. The social networking system 700 includes one or more user devices 710, one or more external systems 720, a social networking system 730, and a network 750. In an embodiment, the social networking system discussed in connection with the embodiments described above may be implemented as the social networking system 730. For purposes of illustration, the embodiment of the social networking system 700, shown by FIG. 7, includes a single external system 720 and a single user device 710. However, in other embodiments, the social networking system 700 may include more user devices 710 and/or more external systems 720. In certain embodiments, the social networking system 730 is operated by a social networking system provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a device having computer functionality, such as a smart-phone, a tablet, a personal digital assistant (PDA), a mobile telephone, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec). In various embodiments, the network 104 may be implemented as the network 750.

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. The external system may also include content providing system(s) 724, as described in more detail herein. In various embodiments, the content providing system(s) 724 may be implemented as the content providing system(s) 102.

The social networking system 730 includes one or more computing devices for a social networking system, including a plurality of users, and providing users of the social networking system with the ability to communicate and interact with other users of the social networking system. In some instances, the social networking system can be represented by a graph, i.e., a data structure including edges and nodes. Other data structures can also be used to represent the social networking system, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, an authorization server 744, a content interaction module 746, and an image application module 748. In an embodiment, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

The social networking system 730 may include the content interaction module 746. In an embodiment, the content interaction module 746 may be implemented as the content interaction module 106.

Hardware Implementation

Figure 8:
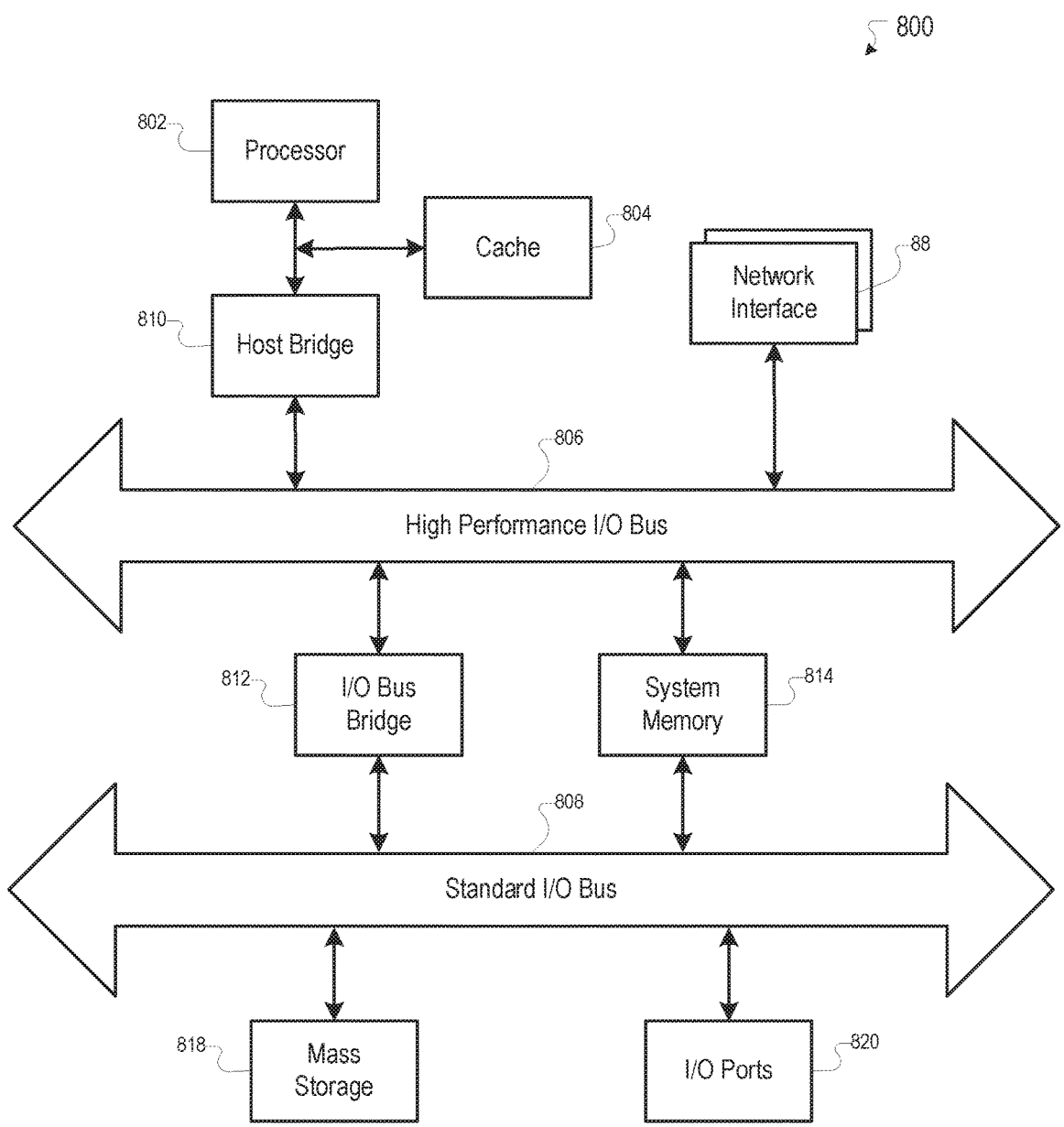
FIG. 8 shows an example of a computer system that may be used to implement one or more of the embodiments described herein in accordance with some embodiments.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment, the computer system 800 may reside with the social networking system 730, the user device 710, and the external system 720, or a component thereof. In an embodiment, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and a network interface 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Furthermore, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some embodiments", "various embodiments", "certain embodiments", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed:

1. A computer implemented method comprising:
receiving, by a computer system, a first notification of a first social network post on a social networking system by a user with respect to a first content item;
receiving, by the computer system, a second notification of a second social network post on the social networking system by the user with respect to a second content item, the second content item at least partially corresponding to the first content item; and
managing, by the computer system, a future consumption edge between the user and the first content item in response to the second social network post, wherein
a representation of the first content item is stored in a future content datastore associated with the user based on the first social network post, and
a representation of the second content item is stored in a consumed content datastore associated with the user based on the second social network post.

2. The method of claim 1, further comprising generating the future consumption edge between the user and the first content item in response to the first social network post.

3. The method of claim 1, wherein the future consumption edge is an edge in a graph.

4. The method of claim 1, wherein the future consumption edge connects a user node representing the user in a graph and a concept node representing the first content item in the graph.

5. The method of claim 1, wherein the user is connected to the second content item by a past consumption edge between a user node representing the user in a graph and a concept node representing the second content item in the graph.

6. The method of claim 1, wherein the first social network post is indicative of a desire to consume the first content item.

7. The method of claim 1, wherein the second social network post is indicative of consumption of the second content item.

8. The method of claim 1, wherein the managing the future consumption edge comprises managing a visibility property of the future consumption edge.

9. The method of claim 8, wherein the managing the future consumption edge comprises hiding the future consumption edge.

10. The method of claim 1, wherein the first content item comprises at least one of a book, an image, music, audio, video, an application, or an interactive content item.

11. A system comprising:
at least one processor;
a memory storing instructions that, when executed by the at least one processor, cause the system to perform a method comprising:
receiving a first notification of a first social network post on a social networking system by a user with respect to a first content item;
receiving a second notification of a second social network post on the social networking system by the user with respect to a second content item, the second content item at least partially corresponding to the first content item; and
managing a future consumption edge between the user and the first content item in response to the second social network post, wherein
a representation of the first content item is stored in a future content datastore associated with the user based on the first social network post, and
a representation of the second content item is stored in a consumed content datastore associated with the user based on the second social network post.

12. The system of claim 11, wherein the method further comprises generating the future consumption edge between the user and the first content item in response to the first social network post.

13. The system of claim 11, wherein the future consumption edge is an edge in a graph.

14. The system of claim 11, wherein the future consumption edge connects a user node representing the user in a graph and a concept node representing the first content item in the graph.

15. The system of claim 11, wherein the user is connected to the second content item by a past consumption edge between a user node representing the user in a graph and a concept node representing the second content item in the graph.

16. A non-transitory computer-readable storage medium including instructions that, when executed by at least one processor of a computing system, cause the computing system to perform a method comprising:
receiving a first notification of a first social network post on a social networking system by a user with respect to a first content item;
receiving a second notification of a second social network post on the social networking system by the user with respect to a second content item, the second content item at least partially corresponding to the first content item; and
managing a future consumption edge between the user and the first content item in response to the second social network post, wherein
a representation of the first content item is stored in a future content datastore associated with the user based on the first social network post, and
a representation of the second content item is stored in a consumed content datastore associated with the user based on the second social network post.

17. The non-transitory computer-readable storage medium of claim 16, wherein the method further comprises generating the future consumption edge between the user and the first content item in response to the first social network post.

18. The non-transitory computer-readable storage medium of claim 16, wherein the future consumption edge is an edge in a graph.

19. The non-transitory computer-readable storage medium of claim 16, wherein the future consumption edge connects a user node representing the user in a graph and a concept node representing the first content item in the graph.

20. The non-transitory computer-readable storage medium of claim 16, wherein the user is connected to the second content item by a past consumption edge between a user node representing the user in a graph and a concept node representing the second content item in the graph.

* * * * *